United States Patent
Tzivanopoulos

(10) Patent No.: US 9,997,938 B2
(45) Date of Patent: Jun. 12, 2018

(54) CIRCUIT ARRANGEMENT AND A METHOD FOR CHARGING A DC LINK CAPACITOR, AS WELL AS A BATTERY AND MOTOR VEHICLE COMPRISING SUCH A CIRCUIT ARRANGEMENT

(71) Applicants: Robert Bosch GmbH, Stuttgart (DE); Samsung SDI Co., Ltd., Yongin-si, Gyeonggi-do (KR)

(72) Inventor: Chrysanthos Tzivanopoulos, Remseck Am Neckar (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 92 days.

(21) Appl. No.: 14/432,775

(22) PCT Filed: Sep. 18, 2013

(86) PCT No.: PCT/EP2013/069359
§ 371 (c)(1),
(2) Date: Apr. 1, 2015

(87) PCT Pub. No.: WO2014/053320
PCT Pub. Date: Apr. 10, 2014

(65) Prior Publication Data
US 2015/0256014 A1    Sep. 10, 2015

(30) Foreign Application Priority Data

Oct. 2, 2012   (DE) .................. 10 2012 217 972

(51) Int. Cl.
*H02J 7/00* (2006.01)
*B60L 11/18* (2006.01)
*H02H 9/00* (2006.01)

(52) U.S. Cl.
CPC ......... *H02J 7/0052* (2013.01); *B60L 11/1803* (2013.01); *H02H 9/001* (2013.01);
(Continued)

(58) Field of Classification Search
CPC ..... H02J 7/0052; B60L 11/1803; H02H 9/001
(Continued)

(56) References Cited

U.S. PATENT DOCUMENTS 5,637,980 A     6/1997  Wu
2006/0220601 A1  10/2006  Horii
(Continued)

FOREIGN PATENT DOCUMENTS

CN    1841880 A    10/2006
CN    102347628 A   2/2012
(Continued)

OTHER PUBLICATIONS

International Search Report corresponding to PCT Application No. PCT/EP20131069359, dated Apr. 9, 2014 (German and English language document) (7 pages).

*Primary Examiner* — Drew A Dunn
*Assistant Examiner* — Zixuan Zhou
(74) *Attorney, Agent, or Firm* — Maginot, Moore & Beck LLP

(57) ABSTRACT

A circuit arrangement for charging a DC link capacitor with electrical energy from a charging battery includes a first switching element. The first switching element can optionally electrically connect a first connection contact of the circuit arrangement for the charging battery to a second connection contact of the circuit arrangement for the DC link capacitor. The circuit arrangement also includes an electrical pre-charging resistor that can connect in parallel with the first switching element. The circuit arrangement also includes two second switching elements that can be
(Continued)

connected in series with the pre-charging resistor and in parallel with the first switching element.

8 Claims, 2 Drawing Sheets

(52) U.S. Cl.
CPC ....... *B60L 2240/36* (2013.01); *B60L 2270/20* (2013.01); *Y02T 10/7005* (2013.01)

(58) Field of Classification Search
USPC .............................. 320/107, 109, 101, 166
See application file for complete search history.

(56) References Cited

U.S. PATENT DOCUMENTS

| | | | |
|---|---|---|---|
| 2008/0150369 A1 | 6/2008 | Suzuki et al. | |
| 2011/0006726 A1* | 1/2011 | Dittmer | B60L 3/0007 320/101 |
| 2012/0025768 A1* | 2/2012 | Nakano | B60L 11/005 320/116 |

FOREIGN PATENT DOCUMENTS

| | | |
|---|---|---|
| DE | 10 2011 016 056 A1 | 10/2012 |
| EP | 2 368 749 A2 | 9/2011 |

\* cited by examiner

CIRCUIT ARRANGEMENT AND A METHOD FOR CHARGING A DC LINK CAPACITOR, AS WELL AS A BATTERY AND MOTOR VEHICLE COMPRISING SUCH A CIRCUIT ARRANGEMENT

This application is a 35 U.S.C. § 371 National Stage Application of PCT/EP2013/069359, filed on Sep. 18, 2013, which claims the benefit of priority to Serial No. DE 10 2012 217 972.0, filed on Oct. 2, 2012 in Germany, the disclosures of which are incorporated herein by reference in their entirety.

The present disclosure relates to a circuit arrangement for charging a DC link capacitor with electrical energy from a charging battery, comprising a first switching element for optionally electrically connecting a first connection contact of the circuit arrangement for the charging battery to a second connection contact of the circuit arrangement for the DC link capacitor, and comprising an electrical pre-charging resistor, which is connectable in parallel with the first switching element. In addition, the disclosure relates to a method for charging a DC link capacitor with electrical energy from a charging battery, in which method a charging current is conducted at least partially through an electrical pre-charging resistor to the DC link capacitor. Furthermore, the disclosure relates to a battery system comprising such a circuit arrangement and to a motor vehicle comprising a battery system, wherein the battery system is connected to a drive system of the motor vehicle.

BACKGROUND

Circuit arrangement for charging a DC link capacitor with electrical energy are generally known. The DC link capacitor in this case serves the purpose of providing currents for a short-term high current requirement of a consumer to be supplied electrical energy from the battery. In order to charge the DC link capacitor with electrical energy, said DC link capacitor is in particular connected in parallel with the charging battery.

At the beginning of a charging operation, the at least one switching element can be closed and the DC link capacitor can be electrically conductively connected directly to the charging battery. Owing to the physical properties of the DC link capacitor, in the case of a direct connection between the charging battery and the DC link capacitor, however, a comparatively high current would flow from the charging battery to the DC link capacitor, in particular at the beginning of the charging operation. Such a high current can overload the charging battery, for example, and possibly even damage it.

In order to at least temporarily limit the charging current, the known circuit arrangements have a charging resistor which can be connected in parallel with the first switching element. The charging resistor is generally an ohmic resistor, which is connectable to the charging battery and/or the DC link capacitor with the aid of a further switching element and is thus capable of bypassing the first switching element. Since the further switching element needs to be capable of switching high currents at high voltages, for example of up to 600 V, the switching element generally requires a large amount of installation space and has a high weight. In particular when using the circuit arrangement in a motor vehicle, however, installation space is scarce and a high weight is disadvantageous. Even in stationary applications, for example in wind turbines, installation space can be limited.

SUMMARY

In accordance with the disclosure, a circuit arrangement for charging a DC link capacitor is provided, which circuit arrangement has two further switching elements in addition to the first switching element, which further switching elements, connected in series with the pre-charging resistor, are connectable in parallel with the first switching element. When using two further switching elements instead of only one further switching element for bypassing the first switching element as in the prior art, surprisingly the required installation space for the circuit arrangement and the weight of the circuit arrangement can be reduced.

In addition, in accordance with the disclosure, a method for charging a DC link capacitor is provided, in which method two switching elements through which the charging current flowing through the pre-charging resistor during operation flows successively are closed successively at the beginning of the charging and/or are opened successively at the end of the charging by the pre-charging resistor. Owing to the fact that the switching elements are closed and/or opened successively, the loading of the individual switching elements by the switching operations can be reduced, and the size and weight of the switching elements can therefore be reduced overproportionally.

The solution according to the disclosure can be improved further by various configurations which are advantageous per se in each case and which can be combined with one another as desired. Details of these embodiments and the advantages associated therewith are set forth below.

In a first advantageous configuration, one of the further switching elements can be in the form of an electronic switch. An electronic switch can also switch high currents. In this case, the electronic switch switches the high currents with a low level of wear and even without any wear, in comparison with an electromechanical switch, as is used in the prior art for connecting the charging resistor, since no switching arcs occur, as in the case of electromechanical switches, during switching operations of an electronic switch. Wear as a result of contact erosion therefore does not occur when using an electronic switch.

The electronic switch is in particular a semiconductor switch and has, for example, a transistor or IGBT, i.e. for example, an insulated-gate bipolar transistor, which conducts, during operation, charging current to or from the pre-charging resistor, wherein the transistor or IGBT switches the charging current without any mechanical contact elements.

Although high currents can be switched without any wear using the electronic switch, galvanic electrical isolation of the charging battery from the DC link capacitor is not possible using an electronic switch since the electronic switch does not have any switching contacts which can be physically separated from one another. In addition, electronic switches such as MOSFETs, i.e. for example, a metal-oxide semiconductor field-effect transistor, and IGBTs contain a design-dependent diode in the reverse direction. In order to be able to galvanically isolate the charging battery and the DC link capacitor from one another in terms of potential in both current directions without any notable or even without any leakage currents, one of the further switching elements can be in the form of an electromechanical switch. The further switching element in the form of an electromechanical switch can in this case be designed to be markedly smaller and lighter than the electromechanical switching element for connecting the pre-charging resistor from the prior art. This is because the electromechanical switch according to the disclosure does not need to switch any high currents since these are already switched by the electronic switch. The electromechanical switch according to the disclosure therefore only needs to perform the galavanic electrical isolation in order to end the charging operation via the pre-charging resistor by means of the electrical isolation. Owing to the fact that no electric current flows through the electronic switch in the open state, i.e. in the non-conducting or off state, no switching arcs can be produced during opening or closing of the electromechanical switch and contact erosion can be prevented.

The electromechanical switch can be a relay which conducts, during operation, charging current to or from the pre-charging resistor. Owing to the isolation of the current circuit by the electrical switch from the voltage circuit by the electromechanical switch, the two switching elements can be so small that both the electronic switch and the electromechanical switch can be in the form of switches which can be provided on a printed circuit board. In particular, the formation of the electromechanical switch as a contactor as in the prior art is not required.

Owing to the fact that the two switching elements can be comparatively small and light, said switching elements can be arranged in a housing of a battery control unit. For example, the circuit arrangement can be arranged at least partially in such a battery control unit for controlling the switching elements, wherein the two further switching elements are arranged within a housing of the battery unit.

As a result, in particular the installation space required for the circuit arrangement can be reduced since only the pre-charging resistor needs to be arranged outside the housing of the battery control unit. Although the pre-charging resistor can also be arranged within the housing of the battery control unit, owing to the fact that a power loss occurring across the pre-charging resistor can generate a large amount of lost heat during charging of the DC link capacitor, the battery control unit could overheat owing to the lost heat without any additional cooling measures. Since the switching takes place in particular using the electromechanical switch without any notable switching arcs, the two further switching elements generate little waste heat during operation, with the result that they can readily be operated in the battery control unit. Owing to the high power loss, the pre-charging resistor can also require a large amount of installation space, which is not available within the battery control unit. The two further switching elements are small enough for arrangement in the battery control unit, however.

In order to begin with the charging operation of the DC link capacitor, the two switching elements are first in a non-conducting state and therefore do not conduct the charging current. First, the battery potential of the charging battery can be applied to the DC link capacitor without the charging current flowing via the pre-charging resistor to the DC link capacitor. For this purpose, the switching element in the form of an electromechanical switch can be closed. If the electromechanical switching element is closed, the battery potential is present at the DC link capacitor. Since, however, the switching element in the form of an electronic switch is still open, i.e. is non-conducting or off, still no current flows from the charging battery via the switching element in the form of an electromechanical switch to the DC link capacitor. During closing of the electromechanical switch, no notable switching arcs therefore occur, with the result that the switching contacts do not become worn as a result of contact erosion.

If the switching element in the form of an electronic switch is now closed, i.e. is switched so as to be electrically conductive, the charging current flows via the charging resistor to the DC link capacitor, again without generating any notable switching arcs.

In order to end the charging of the DC link capacitor via the pre-charging resistor, first the switching element in the form of an electronic switch can be opened, i.e. switched so as to be electrically non-conductive or off. Although the charging current now no longer flows from the charging battery to the DC link capacitor, the switching element in the form of an electromechanical switch now needs to be opened in order to be able to galvanically isolate the charging battery and the DC link capacitor from one another. Since, owing to the electronic switch which is already opened in advance, no notable current can flow from the charging battery via the electromechanical switch to the DC link capacitor, during opening of the electromechanical switch no notable switching arcs can occur, as a result of which contact erosion and therefore wear and thermal loading are prevented.

The charging battery preferably comprises at least one or more battery cells based on lithium and in particular at least one or more lithium-ion battery cells.

BRIEF DESCRIPTION OF THE DRAWINGS

The disclosure will be explained below by way of example using exemplary embodiments with reference to the drawings. The different features of the embodiments can in this case be combined independently of one another, as has already been illustrated in the individual advantageous configurations.

In the drawings.

DETAILED DESCRIPTION

First, the design and operation of a circuit arrangement 1 according to the disclosure are described with reference to the exemplary embodiment in FIG. 1.

Figure 1:
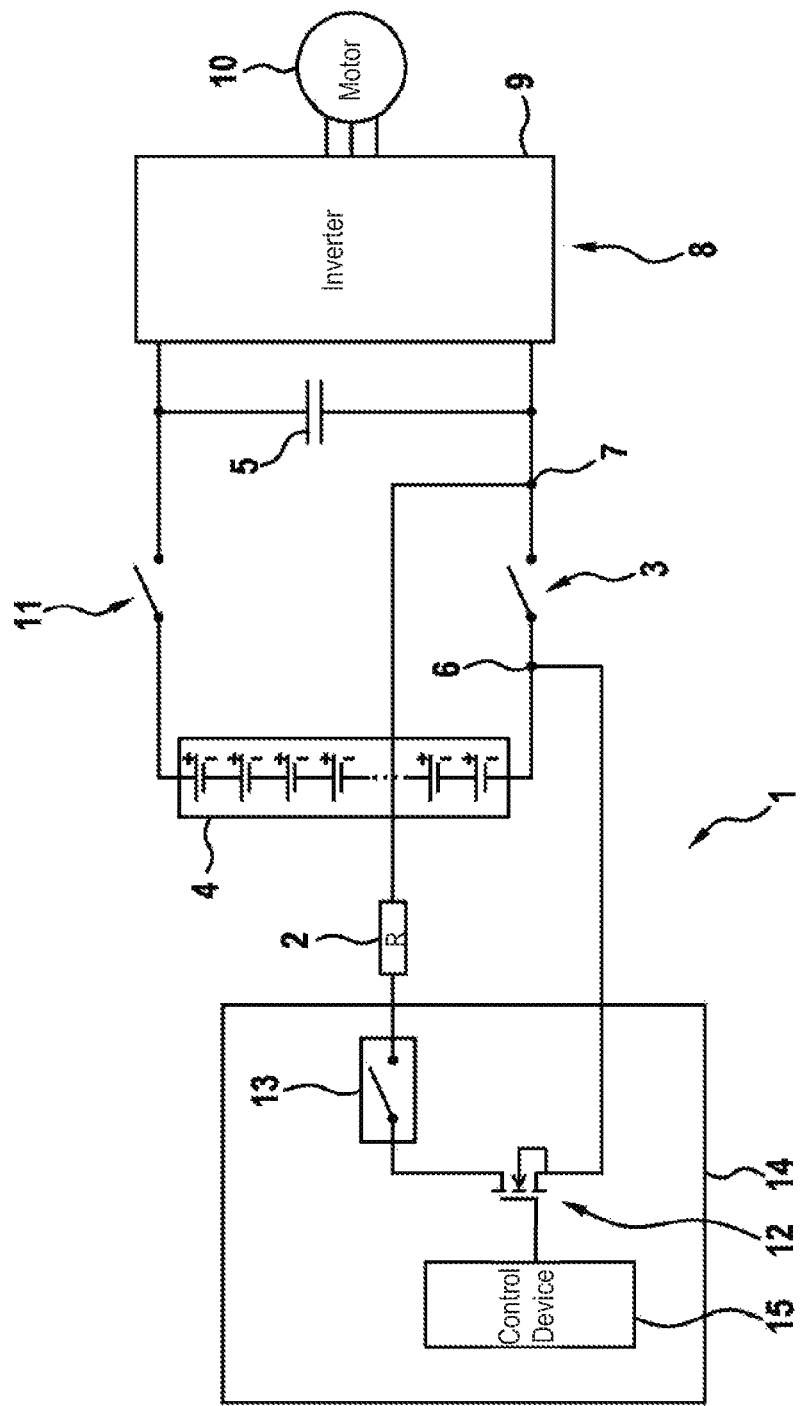
FIG. 1 shows an exemplary embodiment of the circuit arrangement according to the disclosure.

FIG. 1 shows schematically the circuit arrangement 1 comprising an electrical pre-charging resistor 2 and a first switching element 3.

A charging battery 4, which can comprise a plurality of battery cells, is electrically conductively connectable to a DC link capacitor 5 by means of the first switching element 3. The circuit arrangement 1 is connected, via connection contacts 6, 7 to the charging battery 4 and the DC link capacitor 5 in such a way that the first switching element 3 is connected in series with the charging battery 4 and the DC link capacitor 5. The pre-charging resistor 2 is connectable in parallel with the first switching element 3 via the connection contacts 6, 7.

If the first switching element 3, as shown in the exemplary embodiment in FIG. 1, is open, i.e. is electrically non-conducting, no current flows from the charging battery 4 to the DC link capacitor 5. A consumer circuit 8, which is connected in parallel with the DC link capacitor 5 and can have, for example, an inverter 9 and an electric motor 10, for example a servomotor for a windmill vane or a drive motor for a motor vehicle, is also not supplied electrical energy from the charging battery 4.

If the circuit between the charging battery 4 and the DC link capacitor 5 were now to be closed by closing the first switching element 3, the charging current would flow from the charging battery 4 to the DC link capacitor 5. In order to close the circuit, possibly a further switching element 11 would have to be closed, with the charging battery 4 being connectable in series with the DC link capacitor 5 via another current path by means of said further switching element 11.

If the circuit is now closed and the DC link capacitor is not being charged with electrical energy, for example, owing to the physical properties of the DC link capacitor 5 a charging current would flow from the charging battery 4 to the DC link capacitor 5, and this current would be limited substantially only by the internal resistance of the charging battery 4. Such a charging current could result in overloading of or even damage to the charging battery 4.

In order to at least partially charge the DC link capacitor 5 with charging current and in the process to prevent overload of the charging battery 4, the circuit is initially not closed via the switching element 3 at the beginning of the charging operation. Instead, the charging current is conducted, to a limited extend, to the DC link capacitor 5 at least at the beginning of the charging operation via the pre-charging resistor 2. In order to connect the pre-charging resistor 2 in parallel with the first switching element 3, the circuit arrangement 1 has two further switching elements 12, 13, which are connected in series with one another and with the pre-charging resistor 2 and in parallel with the first switching element 3 during the charging operation via the pre-charging resistor 2. If the two further switching elements 12, 13 are closed, i.e. are electrically conductive, the two further switching elements 12, 13, together with the pre-charging resistor 2, bypass the first switching element 3. If the further switching element 11 is provided and closed, the charging current can now flow from the charging battery 4 via the pre-charging resistor 2 to the DC link capacitor 5 although the first switching element 3 is non-conducting.

One of the two further switching elements 12, 13 is preferably in the form of an electronic switch 12, for example a PCB switch, a transistor, an IGBT (insulated-gate bipolar transistor), or a MOSFET. The other of the two further switching elements 12, 13 can be in the form of an electromechanical switch 13, for example a PCB (printed circuit board) relay.

Figure 2:
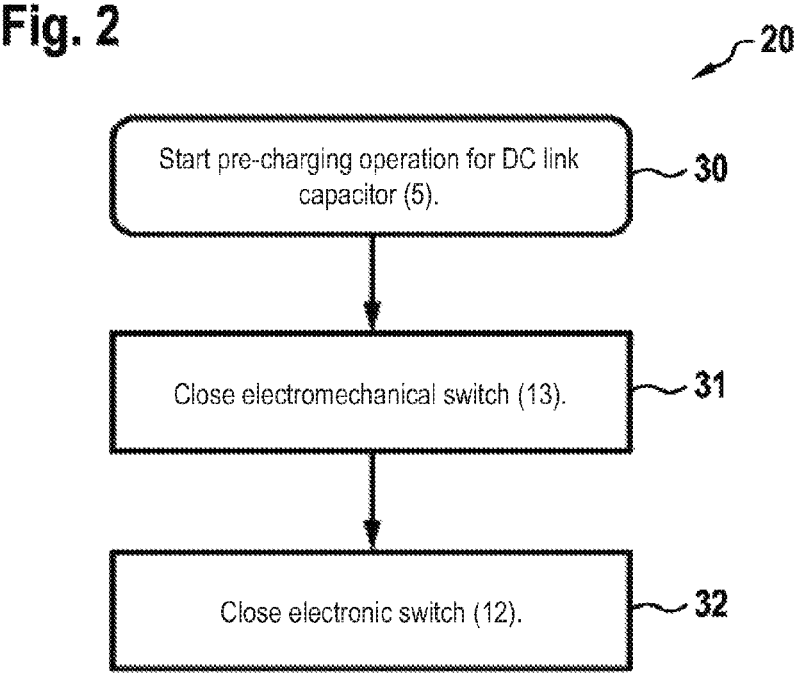
FIG. 2 shows an exemplary embodiment of part of the method according to the disclosure as a flow chart.

FIG. 2 shows part of a method 20 according to the disclosure for charging the DC link capacitor 5 schematically as a flow chart. In a first method step 30, the charging operation is started. For example, the DC link capacitor 5 is connected to the circuit arrangement 1 via the connection contact 7, and the further switching element 11 is closed. In a further method step 31, the switching element 13 in the form of an electromechanical switch is now closed. By virtue of the electromechanical switch 13 being closed, a battery potential of the charging battery 4 which is electrically conductively connected to the circuit arrangement 1 is applied to the DC link capacitor 5. However, as yet no charging current flows from the charging battery 4 via the pre-charging resistor 2 to the DC link capacitor 5 since the second switching element 12 of the two further switching elements 12, 13 is non-conducting, i.e. open or off.

If the switching element 12 in the form of an electronic switch is likewise closed in the now following method step 32, i.e. is switched so as to be electrically conducting, the charging current can flow from the charging battery 4 via the pre-charging resistor 2 and successively through the two further switching elements 12, 13 to the DC link capacitor 5.

The two further switching elements 12, 13 of the circuit arrangement 1 are illustrated as being arranged in a battery control unit 14, wherein the battery control unit 14 has a switching control device 15, with which at least the switching element 12 in the form of an electronic switch and additionally also the switching element 13 in the form of an electromechanical switch can be opened or closed.

Figure 3:
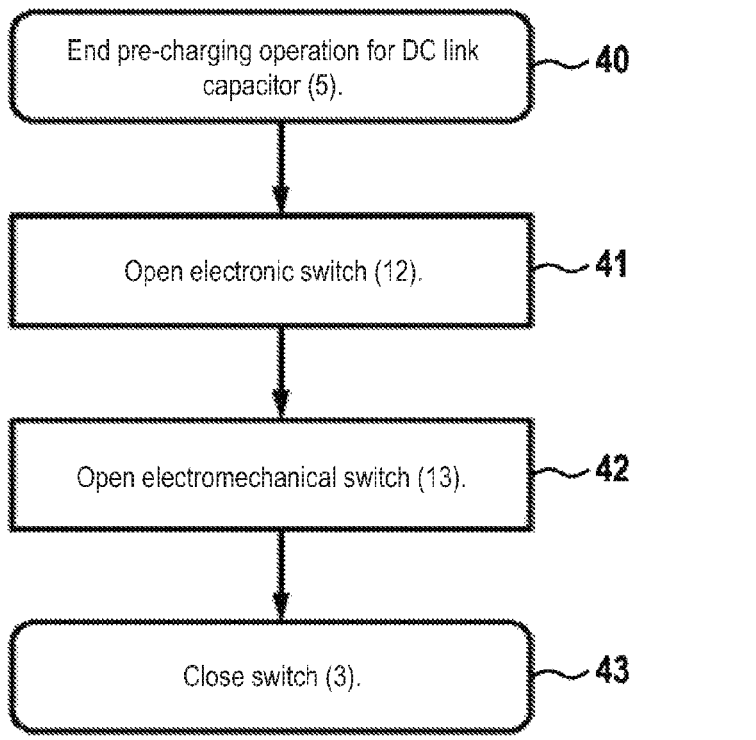
FIG. 3 shows an exemplary embodiment of a further part of the method according to the disclosure as a flow chart.

FIG. 3 shows a further part of the method 20 for charging the DC link capacitor 5. In particular, FIG. 3 shows how the charging of the DC link capacitor 5 via the pre-charging resistor 2 is ended. In a first method step 40, the end of the charging operation via the pre-charging resistor 2 begins. For example, the DC link capacitor 5 has reached a state in which it can be charged directly via the first switching element 3 without the charging current needing to be limited, for example, via the pre-charging resistor 2. At the end of the charging operation, first in method step 41, the switching element 12 in the form of an electronic switch is opened, i.e. is switched so as to be non-conducting or off. As a result, a notable current flow from the charging battery 4 via the pre-charging resistor 2 to the DC link capacitor 5 is ended.

Since the current flow through the open electronic switch 12 is suppressed, in the now following method step 42 the switching element 13 in the form of an electromechanical switch can be opened in deenergized fashion in order to electrically isolate the charging battery 4 and the DC link capacitor 5 from one another. If it is desired to charge the DC link capacitor 5 further without the charging current being limited by the pre-charging resistor 2, the first switching element 3 can be closed at the end of the charging operation via the pre-charging resistor in the following method step 43, so that the charging current can flow unimpeded directly from the charging battery 4 to the DC link capacitor 5. As an alternative or in addition, the battery 4 can now also be electrically conductively connected directly to the consumer circuit.

The invention claimed is:

1. A circuit arrangement for charging a DC link capacitor with electrical energy from a battery, the circuit arrangement comprising:
   a first switching element connected between a first connection contact of the battery and a first connection contact of the DC link capacitor; and
   a series circuit connected in parallel with the first switching element between the first connection contact of the battery and the first connection contact of the DC link capacitor, the series circuit including a series connection of a pre-charging resistor, an electromechanical switch, and an electronic switch, the series circuit being separate from the battery,
   wherein, during a pre-charging operation, the series circuit conducts a pre-charging current between the first connection contact of the battery and the first connection contact of the DC link capacitor,
   wherein a battery control unit is operably connected to control the first switching element, the electromechanical switch, and the electronic switch, the battery control unit being configured to:
      close the electromechanical switch at a beginning of the pre-charging operation;

close the electronic switch at the beginning of the pre-charging operation and after the closing of the electromechanical switch;

open the electronic switch at an end of the pre-charging operation; and open the electromechanical switch at the end of the pre-charging operation and after the opening of the electronic switch.

2. The circuit arrangement as claimed in claim 1, wherein the electronic switch is at least one of a metal-oxide semiconductor field-effect transistor and an insulated-gate bipolar transistor.

3. The circuit arrangement as claimed in claim 1, wherein the electromechanical switch is a relay.

4. The circuit arrangement as claimed in claim 1, wherein the electromechanical switch and the electronic switch are arranged within a housing of the battery control unit.

5. A method for charging a DC link capacitor with electrical energy from a battery, comprising:

conducting, during a pre-charging operation, a pre-charging current between a first connection contact of the battery and a first connection contact of the DC link capacitor via a series circuit including a series connection of a pre-charging resistor, an electromechanical switch, and an electronic switch, the series circuit being separate from the battery;

closing the electromechanical switch at a beginning of the pre-charging operation;

closing the electronic switch at the beginning of the pre-charging operation and after the closing of the electromechanical switch;

opening the electronic switch at an end of the pre-charging operation; and opening the electromechanical switch at the end of the pre-charging operation and after the opening of the electronic switch, wherein a first switching element is connected in parallel with the series circuit between the first connection contact of the battery and the first connection contact of the DC link capacitor.

6. A battery system comprising:

a battery;

a circuit arrangement configured to charge a DC link capacitor, the circuit arrangement comprising:

a first switching element connected between a first connection contact of the battery and a first connection contact of the DC link capacitor; and a series circuit connected in parallel with the first switching element between the first connection contact of the battery and the first connection contact of the DC link capacitor, the series circuit including a series connection of a pre-charging resistor, an electromechanical switch, and an electronic switch t, the series circuit being separate from the battery; and a battery control unit operably connected to control the first switching element, the electromechanical switch, and the electronic switch, the battery control unit configured to at least one of:

close the electromechanical switch at a beginning of a pre-charging operation;

close the electronic switch at the beginning of the pre-charging operation and after the closing of the electromechanical switch;

open the electronic switch at an end of the pre-charging operation; and open the electromechanical switch at the end of the pre-charging operation and after the opening of the electronic switch, wherein, during the pre-charging operation, a pre-charging current is conducted between the first connection contact of the battery and the first connection contact of the DC link capacitor.

7. The battery system of claim 6, wherein the battery system is included in a motor vehicle and the battery system is connected to a drive system of the motor vehicle.

8. The battery system of claim 6, wherein the electromechanical switch and the electronic switch are arranged within a housing of the battery control unit.

* * * * *